United States Patent
Fujii et al.

(10) Patent No.: US 8,584,721 B2
(45) Date of Patent: Nov. 19, 2013

(54) TIRE WITH ROTATION PERIOD INDICATION HOLE, AND METHOD OF INDICATING TIRE ROTATION PERIOD

(75) Inventors: Kensaku Fujii, Kobe (JP); Takehiko Murata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 920 days.

(21) Appl. No.: 10/532,424

(22) PCT Filed: Nov. 20, 2003

(86) PCT No.: PCT/JP03/14883
§ 371 (c)(1), (2), (4) Date: Apr. 22, 2005

(87) PCT Pub. No.: WO2004/050390
PCT Pub. Date: Jun. 15, 2004

(65) Prior Publication Data
US 2005/0269003 A1  Dec. 8, 2005

(30) Foreign Application Priority Data
Dec. 2, 2002 (JP) ................................ 2002-349439

(51) Int. Cl.
*B60C 11/117* (2006.01)
*B60C 11/24* (2006.01)

(52) U.S. Cl.
USPC .................................. 152/154.2; 152/209.17

(58) Field of Classification Search
USPC .......... 152/154.2, 209.17; 156/110.1; 73/146; 29/402.03, 426.1; 173/146
See application file for complete search history.

(56) References Cited

U.S. PATENT DOCUMENTS

| | | | | |
|---|---|---|---|---|
| 1,762,723 A * | 6/1930 | Manly et al. | | 156/113 |
| 1,876,016 A * | 9/1932 | Pederson | | 152/209.5 |
| 2,102,784 A * | 12/1937 | Bridges | | 152/154.2 |
| 2,310,776 A * | 2/1943 | Gay | | 152/209.12 |
| 2,474,013 A * | 6/1949 | Rawis | | 152/209.12 |
| 2,706,509 A * | 4/1955 | White | | 152/154.2 |
| 3,578,055 A | 5/1971 | French et al. | | |
| 3,603,370 A * | 9/1971 | Hylbert et al. | | 152/209.12 |
| 3,653,422 A | 4/1972 | French et al. | | |
| RE30,518 E * | 2/1981 | French | | 152/154.2 |
| 5,445,691 A * | 8/1995 | Nakayama et al. | | 152/209.17 |

(Continued)

FOREIGN PATENT DOCUMENTS

DE 3627832 A1 * 2/1988
EP 989000 A2 * 5/2000

(Continued)

OTHER PUBLICATIONS

Partial translation for Japan 59-025684 (no date).*

(Continued)

*Primary Examiner* — Steven D Maki
(74) *Attorney, Agent, or Firm* — Birch, Stewart, Kolasch & Birch, LLP

(57) ABSTRACT

A tire having a rotation timing indication hole of the invention has a rotation timing indication hole comprising a multi-step hole provided in a tire tread, and respective steps of the hole have different contours from each other. Since the contour of the hole changes when the tire is worn, the rotation timing of the tire can be recognized.

3 Claims, 4 Drawing Sheets

(56) References Cited

U.S. PATENT DOCUMENTS

| | | | | |
|---|---|---|---|---|
| 5,980,668 A | * | 11/1999 | Slingluff | 156/110.1 |
| 6,443,200 B1 | * | 9/2002 | Lopez | 152/209.17 |
| 2002/0036039 A1 | | 3/2002 | Shimura | |
| 2006/0037683 A1 | * | 2/2006 | Cuny et al. | 152/154.2 |
| 2006/0213594 A1 | * | 9/2006 | Kemp et al. | 152/154.2 |

FOREIGN PATENT DOCUMENTS

| | | | | |
|---|---|---|---|---|
| GB | 546975 | * | | 8/1942 |
| GB | 1195241 | A | * | 6/1970 |
| GB | 2061837 | A | * | 5/1981 |
| JP | 55-110608 | | * | 8/1980 |
| JP | 55-110608 | A | | 8/1980 |
| JP | 59-11903 | A | | 1/1984 |
| JP | 59-25884 | Y2 | | 7/1984 |
| JP | 59-188705 | U | | 12/1984 |
| JP | 4-52911 | U | | 5/1992 |
| JP | 06-001114 | A | * | 1/1994 |
| JP | 10-076812 | A | * | 3/1998 |
| SU | 408833 | | * | 7/1974 |
| WO | WO-97/47483 | A1 | | 12/1997 |

OTHER PUBLICATIONS

Machine translation for German 3,627,832 (no date).*
Machine translation for Europe 989,000 (no date).*
Machine translation for Japan 10-076812 (no date).*
Machine translation for Japan 06-001114 (no date).*

* cited by examiner (a)

(b)

TIRE WITH ROTATION PERIOD INDICATION HOLE, AND METHOD OF INDICATING TIRE ROTATION PERIOD

TECHNICAL FIELD

The present invention relates to a vehicle tire having an indicator for indicating the rotation timing of a tire.

BACKGROUND ART

In order to elongate life of tires mounted on a vehicle, change of positions of tires mounted on the vehicle, so-called rotation (position change) of tires, is performed according to the extent of wear of tire treads (surface of tire).

A tire having a tread wear indicator for indicating timing for the above rotation is known in conventional technologies disclosed in, for example, JP-A-55-110608, JP-UM-B-59-25684, or International Publication No. WO97/47483 (JP-T-10-511626).

In these conventional technologies, multi-step holes are formed as rotation timing indication holes in a tire tread, and when a first step of the hole disappears due to wear of the tire, it is determined as a time for rotation of the tire mounting position.

However, in these conventional technologies, since the contour of the rotation timing indication hole is formed in either a circle or a square, recognition of the step of the hole by a visual check is difficult, resulting in missing of a suitable rotation timing. For example, in a two-step hole having contours of double circles (◎), even if the first step is worn to bring the contour of hole into a single circle (○) a user may miss the change of the contour of the hole.

DISCLOSURE OF THE INVENTION

Therefore, an object of the present invention is to provide a tire having a rotation timing indication hole which extremely facilitates recognition of a step of the hole by a visual check to indicate suitable rotation timing and a method of indicating tire rotation timing.

In order to achieve the above object, the invention provides the following technical means.

That is, the present invention provides a tire having a rotation timing indication hole comprising a multi-step hole defined in a tire tread, wherein respective steps of the hole have different contours from each other.

It is preferred that the contours of the respective steps of the hole are formed in different shape from each other, each shape being formed with straight lines or curved lines.

Since the contour of the hole changes, for example, from a shape with curved lines to that with straight lines when the tire is worn, the change of the contour of the hole can be recognized with extreme ease by a visual check.

It is preferred that the rotation timing indication hole comprises a two-step hole, in which a first step of the hole on a tire tread surface side has a contour formed with curved lines, while a second step of the hole on a bottom side has a contour formed with straight lines.

It is preferred that the contour with curved lines forms a circle, while the contour with straight lines forms a polygon inscribed in the circle.

Alternatively, in contrast to the above construction, the first step of the hole on the tire tread surface side may have a contour formed with straight lines, while the second step of the hole on the bottom side may have a contour formed with curved lines.

In this arrangement, it is preferred that the contour with straight lines forms a polygon, while the contour with curved lines forms a circle inscribed in the polygon.

The polygon is preferably any one of a triangle, a square, a pentagon, and a hexagon.

The contour with curved lines is not limited to a circle but may be an ellipse.

It is preferred that a wear indicating portion is provided in the vicinity of the rotation timing indication hole.

The wear indicating portion comprises a wear indicator for indicating timing for changing tires which is also called as a slip sign mark, and a mark (Δ) disposed on a tire shoulder portion for indicating the position thereof. Hence, provision of the rotation timing indication hole in the vicinity of the wear indicating portion facilitates recognition of the rotation timing indication hole.

It is preferable that the rotation timing indication hole comprises twelve holes, in total, arranged in pair in the widthwise direction of the tire, and resulting six pairs of the holes are arranged at uniform intervals in the circumferential direction of the tire.

A method of indicating rotation timing in accordance with the invention is a method of indicating rotation timing of a tire having a rotation timing indication hole formed in a tire tread, wherein the tire rotation timing is indicated by a change of the contour of the rotation timing indication hole.

Since the tire rotation timing is indicated by a change of the contour of the rotation timing indication hole, for example, from a shape with curved lines to a shape with straight lines, the tire rotation timing can be extremely easily recognized by a visual check as compared to the conventional technology with a change of contours between shapes with curved lines or between shapes with straight lines.

According to the invention, the rotation timing can be accurately indicated to perform the rotation (position change) of tires, thereby resulting in long time use of a tire, that is, economical and effective use of a tire.

BEST MODE FOR CARRYING OUT THE INVENTION

The embodiments of the invention will be described below on the basis of the drawings.

Figure 1:
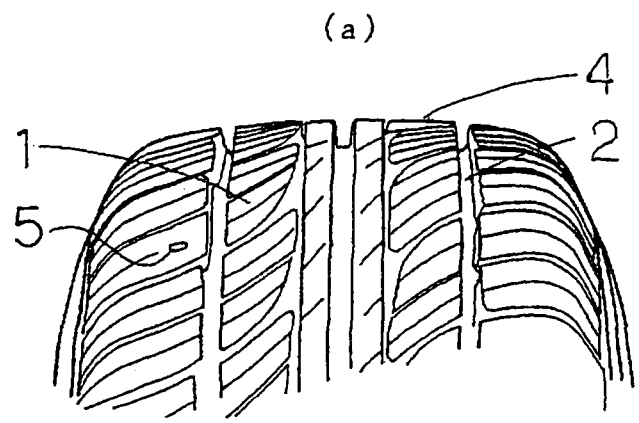
In FIG. 1, (a) is a perspective view of a tire in accordance with the invention; and (b) is a partial enlarged view of (a)
Figure 1:
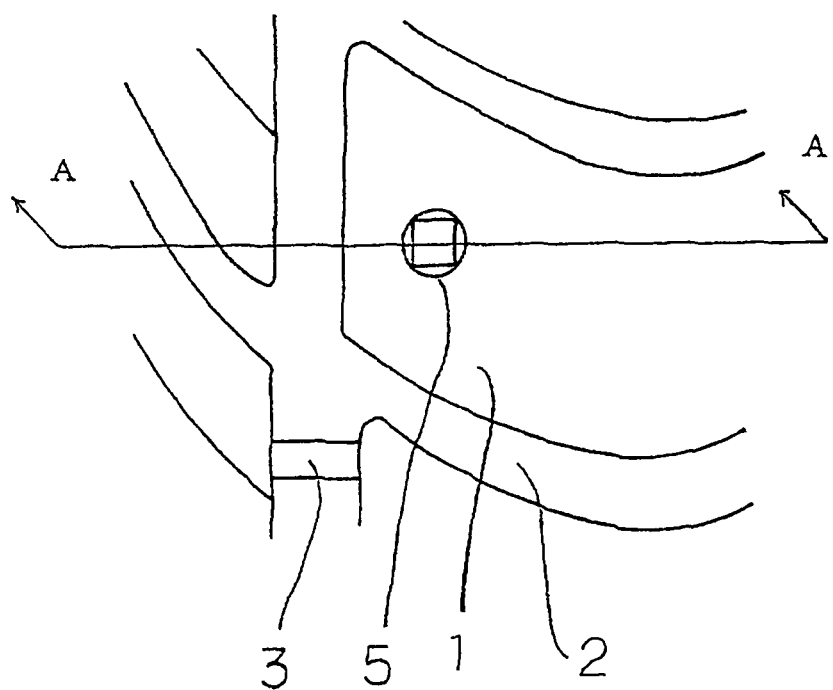
Figure 2:
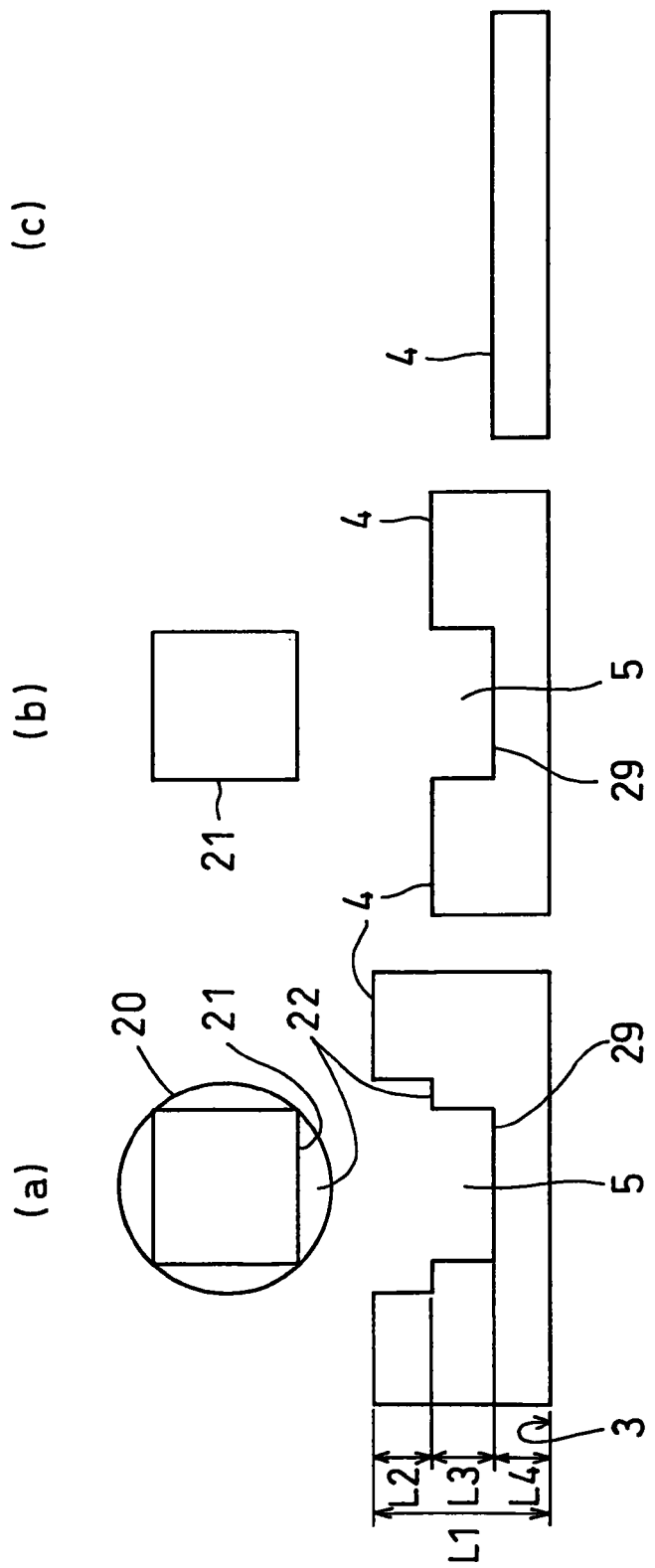
In FIG. 2, (a) is a sectional view taken on a line A-A in FIG. 1 (b) of a new tire and its plan view; (b) is a sectional view taken on the line A-A in FIG. 1(b) at a first rotation timing and its plan view; and (c) is a sectional view taken on the line A-A in FIG. 1(b) at a second rotation timing.

FIG. 1 and FIG. 2 show an embodiment of a tire having a rotation timing indication hole in accordance with the invention. FIG. 1(a) is a perspective view of a tire which shows a tire tread portion 1, a tread groove 2, and the like. FIG. 1(b) is a partial enlarged view of FIG. 1(a) and shows a wear indicating portion 3 raised from the bottom of the tread groove 2 and one rotation timing indication hole 5 provided in the vicinity of the wear indicating portion 3. The wear indicating portion 3 indicates timing for changing a tire when the degree of wear of the tire reaches a limit for safety and needs to be replaced with a new one. The rotation timing indication hole 5 indicates rotation timing for changing a position where the tire is mounted according to the degree of wear of the tire. This rotation timing indication hole 5 is formed to radially inwardly extend from a tread surface 4 of the tire tread portion 1.

FIG. 2 shows a sectional view in the radial direction of tire of the rotation timing indication hole 5 taken along a line A-A in FIG. 1(*b*).

Specifically, FIG. 2(*a*) shows the rotation timing indication hole 5 comprising a multi-step hole in a new tire having no wear. In this embodiment, the rotation timing indication hole 5 is formed as a two-stepped hole in which a contour (shape in the radial direction of hole) of a first step 20 of the hole on the tire tread surface side is formed with a curved line, while a contour of a second step 21 of the hole on the bottom side is formed with straight lines. A stepped portion 22 is formed between the first step 20 and the second step 21 of the hole.

A first depth from the tread surface 4 to the surface of the wear indicating portion 3 is assumed to be L1, a second depth from the tread surface 4 to the stepped portion 22 is assumed to be L2, and a third depth from the stepped portion 22 to a bottom 29 of the second step 21 of the hole is assumed to be L3. Further, a fourth depth from the bottom 29 to the wear indicating portion 3 is assumed to be L4.

The contour of the first step 20 of the hole is a circle. The contour of the second step 21 of the hole is a square. This square has a size to be inscribed in the circle, but does not need to be inscribed in the circle. Alternatively, the square does not need to be a regular square but may be a rectangle or a rhombus.

According to the above construction, when the tire tread surface 4 is worn by the depth L2, the first step 20 of the hole disappears and the second step 21 of the hole appears on a position flush with the tire tread surface 4.

Specifically, as shown in FIG. 2 from (*a*) to (*b*), the tread surface passes the stepped portion 22 where the contour of the rotation timing indication hole 5 changes from a circle to a square. A change from the circle of the first step 20 of the hole to the square of the second step 21 of the hole is a change from a smooth loop-shape with a curved line to a polygon consisting of a combination of bent straight lines, and such a change in figure can be clearly recognized. The change of the contour can be recognized by visually checking the hole in the tread surface of the tire tread portion.

The time when the contour of the rotation timing indication hole 5 changes from FIG. 2(*a*) to FIG. 2(*b*) is determined to be a first rotation timing. That is, when the contour of the rotation timing indication hole 5 changes from a circle to a square, positions of the tires mounted on the vehicle are changed between left and right or between front and rear.

When the tire is further worn as shown in FIG. 2(*c*), the second step 21 of the hole also disappears. This indicates a second rotation timing.

Further, when the wear of tire further advances and the tread surface 4 reaches the wear indicating portion 3, the tire needs to be changed.

As is well-known, a mark (usually, a modified triangle) that can be recognized even when the tire is worn out is provided in the vicinity of the wear indicating portion 3 for facilitating finding of the wear indicating portion 3. As shown in FIG. 1(*b*), since the rotation timing indication hole 5 is disposed in the vicinity of the wear indicating portion 3, a position of the rotation timing indication hole 5 also can be recognized immediately.

The wear indicating portions 3 are provided at twelve positions, in total, which are arranged in pair to be symmetrical with respect to a tire equator, and the resulting six pairs of the wear indicating portions are disposed at uniform intervals in the circumferential direction of the tire. Accordingly, the rotation timing indication holes 5 are also formed at twelve positions.

In the above embodiment, the contour of the first step 20 of the hole is formed with a curved line and the contour of the second step 21 of the hole is formed with straight lines, but in contrast to this, it is also possible to form the contour of the first step 20 of the hole with straight lines and to form the contour of the second step 21 of the hole with a curved line.

Figure 3:
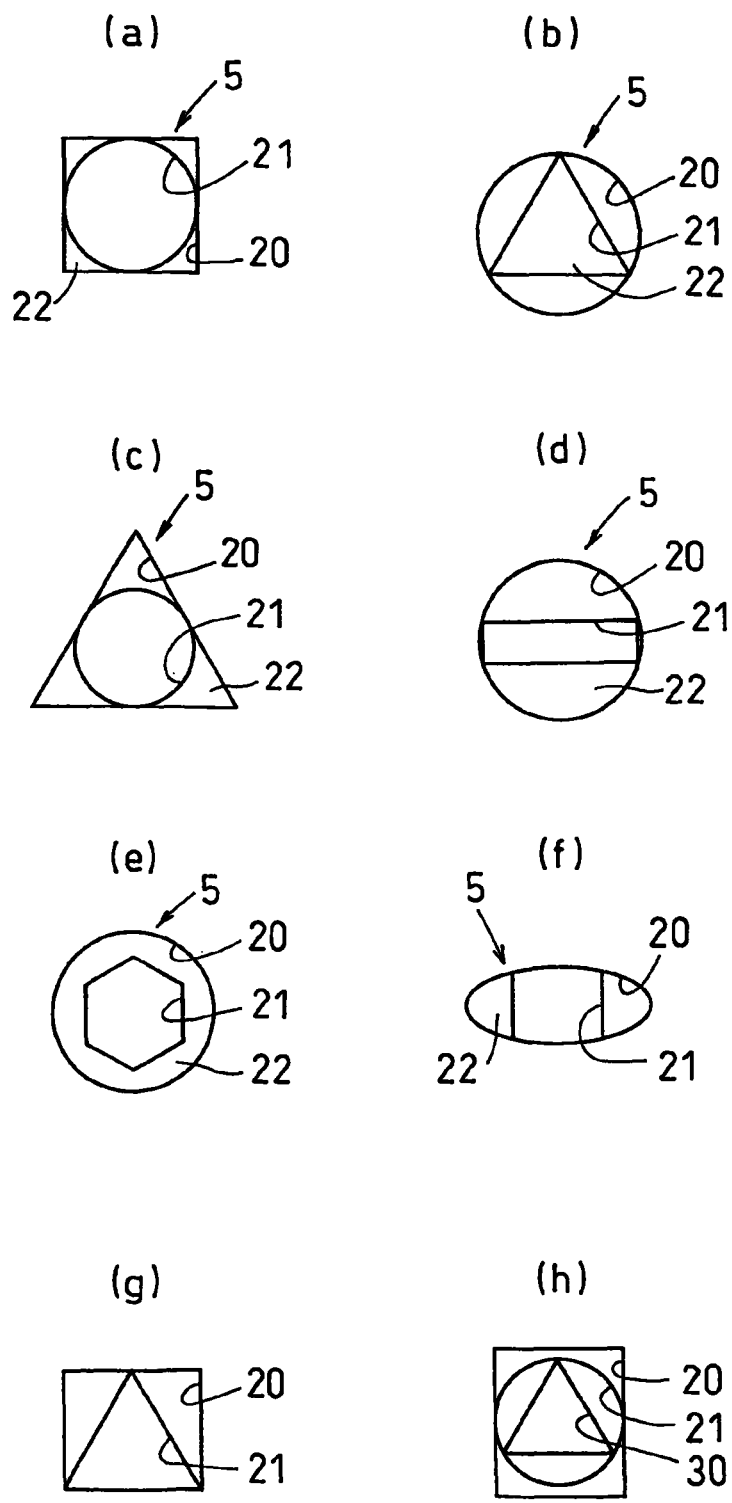
In FIG. 3, (a) to (h) are plan views to show various shapes of contours of a rotation timing indication hole included in the invention.

In FIG. 3, various modifications of the contours of the rotation timing indication hole 5 included in the scope of the invention are shown.

In a modification shown in FIG. 3(*a*), the contour of the first step 20 of the hole is a regular square and the contour of the second step 21 of the hole is a circle inscribed in the regular square.

In a modification shown in FIG. 3(*b*), the contour of the first step 20 of the hole is a circle and the contour of the second step 21 of the hole is a regular triangle inscribed in the circle.

In a modification shown in FIG. 3(*c*), the contour of the first step 20 of the hole is a regular triangle and the contour of the second step 21 of the hole is a circle inscribed in the regular triangle.

In a modification shown in FIG. 3(*d*), the contour of the first step 20 of the hole is a circle and the contour of the second step 21 of the hole is a rectangle inscribed in the circle.

In a modification shown in FIG. 3(*e*), the contour of the first step 20 of the hole is a circle and the contour of the second step 21 of the hole is a hexagon that is not inscribed in the circle.

In a modification shown in FIG. 3(*f*), the contour of the first step 20 of the hole is an ellipse and the contour of the second step 21 of the hole is a shape including parallel straight lines.

In a modification shown in FIG. 3(*g*), the contour of the first step 20 of the hole is a square and the contour of the second step 21 of the hole is a triangle.

In a modification shown in FIG. 3(*h*), contours of a three-step hole are shown, in which: the contour of the first step 20 of the hole is a square; the contour of the second step 21 of the hole is a circle; and the contour of the third step 30 of the hole is a triangle.

The contours of the rotation timing indication hole 5 are not limited to the above modifications so long as the hole consists of a step having a contour of a loop-shape with a curved line and a step having a polygonal contour formed with a combination of bent straight lines. The polygon may be an n-th polygon and, in general, n is preferably less than 5. However, n may be more than 5, that is, a hexagon can also be distinguished from a loop-shape with a curved line.

Further, in a normal pneumatic tire, the values of the second to fourth depths L2 to L4 are set to 2 mm, respectively. However, the second to fourth depths L2 to L4 are not to be limited to the above-described value for performing suitable rotation of a tire in accordance with materials of the tire and kinds of a vehicle to which the tire is mounted. Further, although a diameter of the rotation timing indication hole 5 should not be limited to a specific value, a rotation timing indication hole 5 having a diameter approximately equal to the length of the wear indicating portion 3 can be recognized in the same way as the wear indicating portion 3 which can be recognized.

Figure 4:
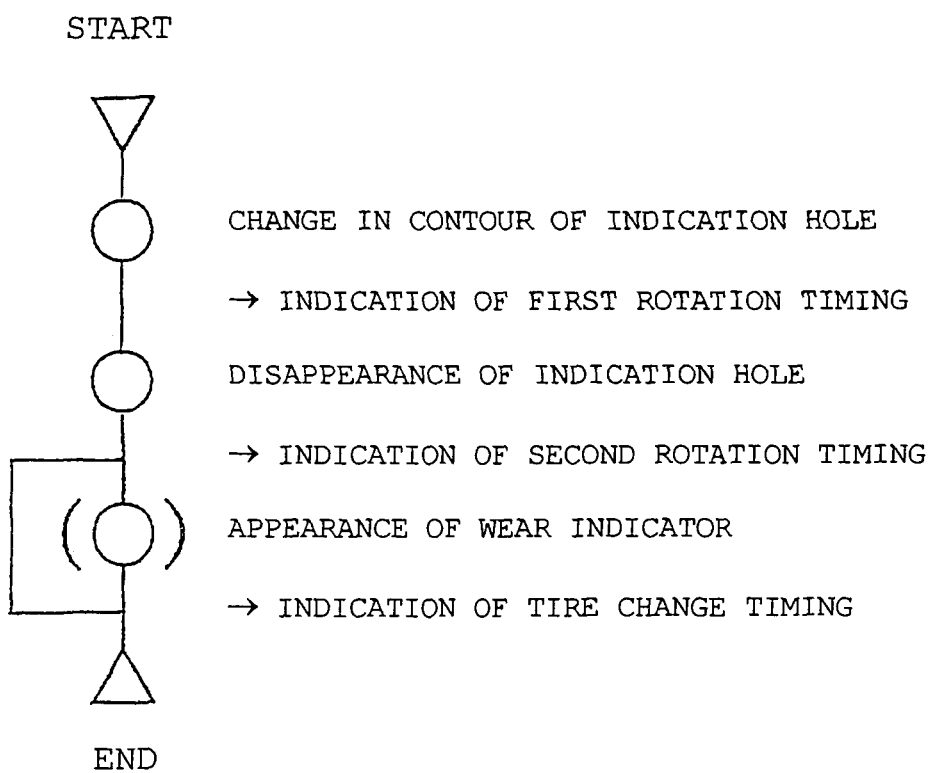
FIG. 4 is a flow chart of an indication method.

FIG. 4 is a flow chart of a method of indicating rotation timing of a tire having the above-described rotation timing indication hole.

According to this flow chart, a first rotation timing (the rotation timing indication hole 5 at this timing corresponds to FIG. 2(b)) is indicated when the tire tread surface 4 passes a portion (stepped portion 22) where the shape (contour) in the radial direction of the rotation timing indication hole 5 changes suddenly, for example, from a circle (first step 20 of the hole) to a square (second step 21 of the hole) to clearly change the contour of the rotation timing indication hole 5, that is, when the shape of the rotation timing indication hole 5 changes.

As shown in the flow chart described above, after the first rotation is performed, continuous driving of the vehicle wears the tire to cause the rotation timing indication hole 5 to disappear, whereby a second rotation timing is indicated.

Since loads applied to the tire varies depending on a position where the tire is mounted and a function of the tire, the tire tends to wear only on one side. In order to use the tire for a longer period of time than usual, that is, in order to use the tire economically, the rotation (position change) of the tire at suitable timing is required. In particular, it is effective for preventing the one-sided tire wearing to change positions of tires by crossing on the opposite side, or additionally, to mount the tires so as to reversely rotate. Since the state of wear of the tire varies depending on the conditions of roads, climate, and weather conditions when the vehicle runs, suitable timing for the rotation of the tire can not be determined by the sensory grasping of rotation timing on the basis of driving distance.

The rotation timing indication hole 5 in accordance with the invention and the method in accordance with the invention enables to grasp accurate rotation timing which takes the amount of physical wear of the tire into consideration.

Since the rotation timing indication hole 5 disclosed in the present invention can be formed by incorporating a mold having the shape of the hole in manufacturing process, any troublesome process which is required, for example, in manufacturing tires designed to indicate the degree of wear of tire with variation of colors is not required. Accordingly, the present invention is extremely useful in the development of the tire industry.

The invention is not limited to the embodiments described above. That is, the number of steps of the rotation timing indication hole is not limited to two steps but three or more steps may be formed, and the combinations of contours of the steps may consist of different curved lines such as a combination of a circle and an ellipse.

INDUSTRIAL APPLICABILITY

The invention is applicable in the vehicle tire manufacturing industry, the vehicle maintenance facilities, and the like.

The invention claimed is:

1. A tire having a rotation timing indication hole comprising a multi-step hole extending in a depth wise direction into a tread of the tire, wherein
    the multi-step hole is bounded by a peripheral sidewall having (1) an outer step with a peripheral edge (a) extending continuously and completely about the hole at the tread surface and (b) circumscribing a first cross-sectional area of the hole and (2) an inner step with a peripheral edge (a) completely surrounding a lower section of the hole, (b) circumscribing a second cross-sectional area of the hole that is smaller than the first cross-sectional area and (c) located at a greater depth in the tread than the peripheral edge of the outer step;
    the outer step and the peripheral edge of the outer step have a contour that forms a circle;
    the inner step and the peripheral edge of the inner step have a contour that forms a regular polygon with four or fewer sides, the contour of the inner step and the peripheral edge of the inner step being inscribed on the contour of the outer step and the peripheral edge of the outer step, whereby the contour of the inner step and the peripheral edge of the inner step consists of (1) peripherally spaced points that are coincident with the contour of the outer step and the peripheral edge of the outer step and (2) segments between the peripherally spaced points that are spaced inwardly from the contour of the outer step and the peripheral edge of the outer step; and
    the outer step and the inner step have depths separately representative of different degrees of wear of a tread surface until tire rotation timing; whereby
    when the tire is in an unworn state, the contour of the outer step will be discernible at the tread surface and will be indicative of an unworn state of the tread, and when the tire has undergone predetermined wear, the different contour of the inner step will be discernible at the tread surface and will be indicative of a predetermined state of wear of the tread.

2. The tire having the rotation timing indication hole as set forth in claim 1, wherein the rotation timing indication hole comprises twelve holes, in total, arranged in pairs in the widthwise direction of the tire, the resulting six pairs of the holes being arranged at uniform intervals in a circumferential direction of the tire.

3. The tire having the rotation timing indication hole as set forth in claim 1, wherein
    a plurality of rotation timing indication holes are provided in the tread, and
    at least one of the rotation timing indication holes is located at a position that is spaced from the equatorial center of the tread in the widthwise direction of the tire.

* * * * *